US012798301B2

(12) United States Patent
Sams

(10) Patent No.: US 12,798,301 B2
(45) Date of Patent: Nov. 17, 2026

(54) SYSTEM AND METHOD FOR INDIRECT TIRE WEAR MODELING AND PREDICTION FROM TIRE SPECIFICATION

(71) Applicant: Bridgestone Americas Tire Operations, LLC, Nashville, TN (US)

(72) Inventor: Thomas A. Sams, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 19/113,747

(22) PCT Filed: Oct. 2, 2023

(86) PCT No.: PCT/US2023/075698
§ 371 (c)(1),
(2) Date: Mar. 20, 2025

(87) PCT Pub. No.: WO2024/091773
PCT Pub. Date: May 2, 2024

(65) Prior Publication Data

US 2026/0001374 A1 Jan. 1, 2026

Related U.S. Application Data

(60) Provisional application No. 63/419,823, filed on Oct. 27, 2022.

(51) Int. Cl.
*B60C 11/24* (2006.01)
*B60C 99/00* (2006.01)
(Continued)

(52) U.S. Cl.
CPC .......... *B60C 11/246* (2013.01); *B60C 99/006* (2013.01); *G06F 30/15* (2020.01); *G06F 30/23* (2020.01); *G06F 2119/14* (2020.01)

(58) Field of Classification Search
CPC ..... B60C 11/246; B60C 99/006; B60C 23/02; G06F 30/15; G06F 30/23; G06F 2119/14
See application file for complete search history.

(56) References Cited

U.S. PATENT DOCUMENTS

| | | | |
|---|---|---|---|
| 11,772,432 | B2 | 10/2023 | Ishizaka et al. |
| 2010/0030533 | A1 | 2/2010 | Ueda |

FOREIGN PATENT DOCUMENTS

| | | | |
|---|---|---|---|
| CN | 113665302 A | 11/2021 | |
| JP | H11153520 A | 6/1999 | |

(Continued)

OTHER PUBLICATIONS

European Patent Office, European Patent Search Report for Application No. 23883542.5-1009, dated Jul. 30, 2026, 8 pages.

*Primary Examiner* — Tarun Sinha
(74) *Attorney, Agent, or Firm* — Patterson Intellectual Property Law, PC

(57) ABSTRACT

A system and method are disclosed for indirect tire wear modeling and implementation. Data storage network has stored thereon accessible finite element (FEA) models and corresponding direct tire wear models for each of various types of tires. A computing network is functionally linked to the data storage network and configured to iteratively develop a control model scaling values for various tire parameters for a selected control tire, from the types of tires having a corresponding accessible FEA model, to respective values for the tire parameters for an arbitrary type of tire lacking a corresponding accessible FEA model. For a provided first type of tire lacking a corresponding accessible FEA model, corresponding values are obtained for the tire parameters, and an indirect tire wear model is generated for the first type of tire based on the first control model, the corresponding direct tire wear model, and the obtained tire parameter values.

18 Claims, 4 Drawing Sheets

(51) Int. Cl.

| | |
|---|---|
| ***G06F 30/15*** | (2020.01) |
| ***G06F 30/23*** | (2020.01) |
| *G06F 119/14* | (2020.01) |

(56) References Cited

FOREIGN PATENT DOCUMENTS

| | | | |
|---|---|---|---|
| JP | 2005263070 | A | 9/2005 |
| JP | 2006056481 | A | 3/2006 |
| JP | 4291561 | B2 | 7/2009 |
| JP | 2009265693 | A | 11/2009 |
| JP | 4569141 | B2 | 10/2010 |
| JP | 2011148465 | A | 8/2011 |
| JP | 2015123941 | A | 7/2015 |
| JP | 6467792 | B2 | 2/2019 |
| JP | 2020164126 | A | 10/2020 |
| JP | 6806121 | B2 | 1/2021 |
| JP | 2022521836 | A | 4/2022 |
| KR | 20090044801 | A | 5/2009 |
| WO | 2024091773 | A1 | 5/2024 |

SYSTEM AND METHOD FOR INDIRECT TIRE WEAR MODELING AND PREDICTION FROM TIRE SPECIFICATION

FIELD OF THE INVENTION

The present invention relates generally to estimation and prediction of tire state for wheeled vehicles. More particularly, an embodiment of an invention as disclosed herein relates to systems and methods for indirectly developing and implementing tire wear models from general tire specifications, in the characterization and prediction of states and conditions for tires of wheeled vehicles including but not limited to motorcycles, consumer vehicles (e.g., passenger and light truck), commercial and off-road (OTR) vehicles.

BACKGROUND

Prediction of tire wear is an important tool for anyone owning or operating vehicles, particularly in the context of fleet management. At a certain point it becomes critical to be aware of changing tire conditions over time, as insufficient tire tread can create unsafe driving conditions. However, irregular tread wear may occur for a variety of reasons that may lead users to replace a tire sooner than would otherwise have been necessary. Vehicles, drivers, driving conditions, and any number of other factors can cause tires to wear at very different rates. That said, it is undesirable to rely on measurements of tread depth and other such indicators of a current tire wear state, at least because such measurements may be difficult to obtain and/or imprecise in real-time, and further because such measurements alone fail to predict future tire wear states.

Accordingly, tire wear models have been developed for predictive implementation, enabling for example tire wear state predictions for tires throughout their respective life cycles. However, tire wear is a complex phenomenon to model. There are accurate models currently in existence that utilize finite element analysis (FEA), but these simulations can typically take weeks to complete. If it is desired to simulate the wear rate at several different tread depths, this would further take months of computationally expensive simulations.

It would be desirable to develop additional tire wear models which can indirectly model a tire for which a corresponding and complex FEA (or equivalent) model is unavailable, or otherwise provide reasonably accurate tire wear modeling during a time period in which such complex models are not yet available.

BRIEF SUMMARY

An embodiment of a method as disclosed herein for indirect tire wear modeling and implementation builds upon or supplements the existence of various accessible finite element models and corresponding direct tire wear models for each of a plurality of types of tires. A control model is iteratively developed, scaling values for a plurality of tire parameters for a selected control tire from the plurality of types of tires having a corresponding accessible finite element model to respective values for the plurality of tire parameters for an arbitrary type of tire lacking a corresponding accessible finite element model. For a provided first type of tire lacking a corresponding accessible finite element model, corresponding values are obtained for the plurality of tire parameters, and an indirect tire wear model is generated for the first type of tire based on the first control model, the corresponding direct tire wear model, and the obtained values for the first type of tire regarding the plurality of tire parameters.

In one exemplary aspect according to the above-referenced embodiment, a tire wear state may be predicted at one or more future times for a first tire of the first type installed on a vehicle, based at least in part on the indirect tire wear model for the first type of tire.

In another exemplary aspect according to the above-referenced embodiment, a type of the vehicle and/or an application of the tire may be provided as inputs to the indirect tire wear model for predicting the tire wear state at the one or more future times.

In another exemplary aspect according to the above-referenced embodiment, actual tire performance values of the first tire may be monitored over time, and the monitored actual tire performance values applied to determine a current wear state of the first tire based on the indirect tire wear model for the first type of tire.

In another exemplary aspect according to the above-referenced embodiment, the determined current wear state of the first tire may be provided as feedback for iteratively developing a further tire wear model for the first type of tire.

In another exemplary aspect according to the above-referenced embodiment, a replacement time for the first tire may be predicted, based on the current wear state or the predicted tire wear state as compared with tire wear thresholds associated with the first type of tire.

In another exemplary aspect according to the above-referenced embodiment, the step of generating an indirect tire wear model may comprise determining a frictional energy associated with the first type of tire based at least in part on the first control model and the obtained values for the first type of tire regarding the plurality of tire parameters.

In another exemplary aspect according to the above-referenced embodiment, the frictional energy associated with the first type of tire may be related to wear energy according to a determined resilience of a corresponding tread compound.

In another exemplary aspect according to the above-referenced embodiment, the step of developing the control model may further comprise determining an empirical relationship between wear energy at zero force and values for the plurality of tire parameters, using one or more coefficients extrapolated from one or more of the plurality of accessible finite element models. The step of generating an indirect tire wear model may further comprise correlating the frictional energy associated with the first type of tire to wear energy based at least in part on the determined empirical relationship.

In another exemplary aspect according to the above-referenced embodiment, the control model may comprise one or more scale factors for application to associated tire parameters relating to tread stiffness and/or carcass stiffness of the selected control tire.

In another embodiment, a system is disclosed herein for indirect tire wear modeling and implementation, and includes a data storage network having stored thereon accessible finite element models and corresponding direct tire wear models for each of a plurality of types of tires, and a computing network functionally linked to the data storage network. The computing network is configured to direct the performance of operations in a method according to the above-referenced embodiment, and optionally any one or more of the recited aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
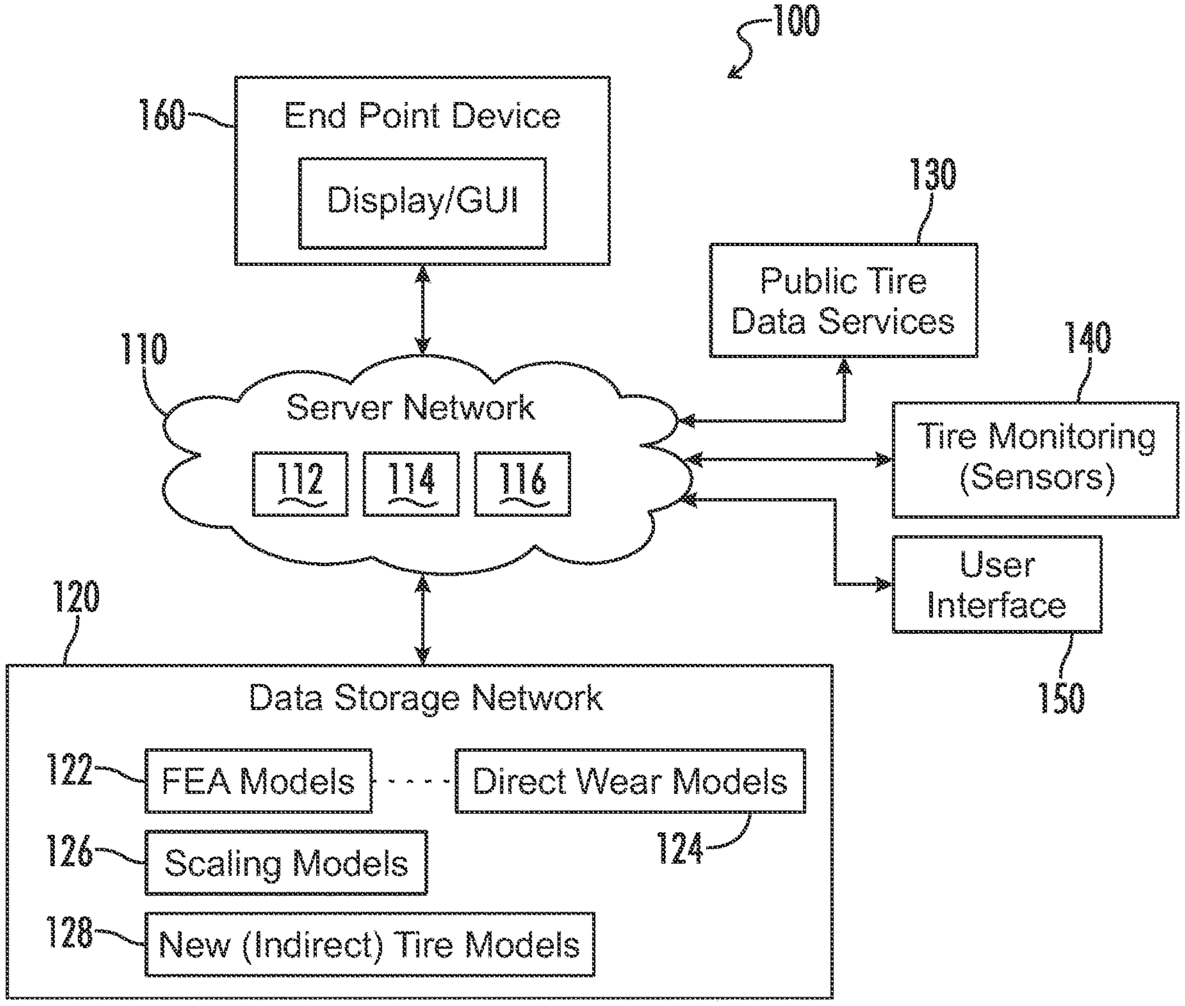
FIG. 1 is a block diagram representing an exemplary embodiment of a system as disclosed herein.

Referring generally to FIGS. 1-4, various exemplary embodiments of an invention may now be described in detail. Where the various figures may describe embodiments sharing various common elements and features with other embodiments, similar elements and features are given the same reference numerals and redundant description thereof may be omitted below.

In various embodiments, indirect tire wear models as disclosed herein may for example have relatively lower accuracy but still provide reasonable wear predictions, while being capable of quick and easy development and implementation using only basic tire specification data that is publicly available.

Various embodiments of a system as disclosed herein may include centralized computing nodes (e.g., a cloud server) in functional communication with a plurality of distributed data collectors and computing nodes (e.g., associated with individual fleet management entities, end users, vehicles, tires, and the like) for effectively developing and implementing models as disclosed herein.

Referring initially to FIG. 1, an exemplary embodiment of the system 100 includes at least a server network 110 and a data storage network 120, and further includes or is functionally linked to one or more public tire data sources 130, a tire monitoring network 140 including for example tire-mounted sensors and intermediary devices, an onboard computing device including a user interface 150 for each of a plurality of vehicles, for example in a defined vehicle fleet, endpoint computing devices 160 for each of a plurality of users such as for example fleet management administrators, and the like. One or more of the aforementioned components may be connected or otherwise functionally linked via a communications network (not shown) which in various embodiments may include, in whole or in part, the Internet, a public network, a private network, or any other communications medium capable of conveying electronic communications.

In various exemplary embodiments, any or all of the computing devices 110, 150, 160 may be implemented as at least one of a server computer, a server device, a desktop computer, a laptop computer, a smart phone, or other equivalent electronic device capable of executing program instructions. The server network may include a processor 112, memory 114 having program logic residing thereon, and a communication unit 116 for selectively linking the one or more servers in the network to other components such as recited above. In certain embodiments, the server network 110, the data storage network 120, and a plurality of onboard computing devices or program modules residing thereon may collectively define a host system for tire wear monitoring of tires mounted on the vehicles associated with the onboard computing devices 150. An onboard computing device 150 may be portable or otherwise modular as part of a distributed vehicle data collection and control system, or otherwise may be integrally provided with respect to a central vehicle data collection control system (not shown).

Other vehicle components in communication with the onboard computing devices 150 may typically include one or more sensors such as, e.g., vehicle body accelerometers, gyroscopes, inertial measurement units (IMU), position sensors such as global positioning system (GPS) transponders, tire mounted sensors, tire pressure monitoring system (TPMS) sensor transmitters and associated onboard receivers, or the like, as linked for example to a controller area network (CAN) bus network and providing signals thereby to local processing units.

In view of the following discussion, other sensors for collecting and transmitting vehicle data such as pertaining to velocity, acceleration, braking characteristics, or the like will become sufficiently apparent to one of ordinary skill in the art and are not further discussed herein. Various bus interfaces, protocols, and associated networks are well known in the art for the communication of vehicle kinetics data or the like between the respective data source and the local computing device, and one of skill in the art would recognize a wide range of such tools and means for implementing the same.

Vehicle and tire sensors may in an embodiment further be provided with unique identifiers, wherein the onboard computing device 150 can distinguish between signals provided from respective sensors on the same vehicle, and further in certain embodiments wherein a central server 110 and/or fleet maintenance supervisor client device 160 may distinguish between signals provided from tires and associated vehicle and/or tire sensors across a plurality of vehicles. In other words, sensor output values may in various embodiments be associated with a particular tire, a particular vehicle, and/or a particular tire-vehicle system for the purposes of onboard or remote/downstream data storage and implementation for calculations as disclosed herein. The onboard device processor may communicate directly with the hosted server network 110 as shown in FIG. 1, or alternatively the driver's mobile device or truck-mounted computing device may be configured to receive and process/transmit onboard device output data to the hosted server and/or fleet management server/device.

The data storage network 120 as shown in FIG. 1 may include for example a plurality of databases or equivalent storage media for retrievably storing models 122, 124, 126, 128 and input data for development thereof. Vehicle data, sensed tire data, data from the public tire data sources 130, and the like, once transmitted via a communications network to the hosted server network 110, may accordingly be stored for example in a database associated therewith. The system 100 may include or otherwise selectively retrieve at least FEA models 122, direct tire wear models 124, scaling models 126, and/or new tire (indirect) wear models for processing inputs.

It should be noted that an embodiment of a system 100 as represented in FIG. 1 is not limiting on the scope of a system or method 200 as disclosed herein, and that in alternative embodiments one or more of the models as disclosed herein may be implemented locally at an onboard computing device 150 for a vehicle (e.g., electronic control unit) or another end point device 160 such as a fleet management device or server rather than at the central (host) server level 110. For example, one or more of the models as disclosed herein may be generated and trained over time at the host server level 110 and downloaded to the onboard computing device 150 and/or end point device 160 for local execution of one or more steps or operations as disclosed herein.

In an embodiment, an estimated or predicted tire state may be provided as an output from the model to one or more downstream models or applications. As represented for example in FIG. 1, a feedback signal corresponding to the predicted tire wear status (e.g., predicted tread depth at a given distance, time, or the like) may be provided to an onboard computing device 150 associated with the vehicle itself, or to a mobile device 160 associated with a user, such as for example integrating with a user interface configured to provide alerts or notice/recommendations that a tire should or soon will need to be replaced.

Figure 2:
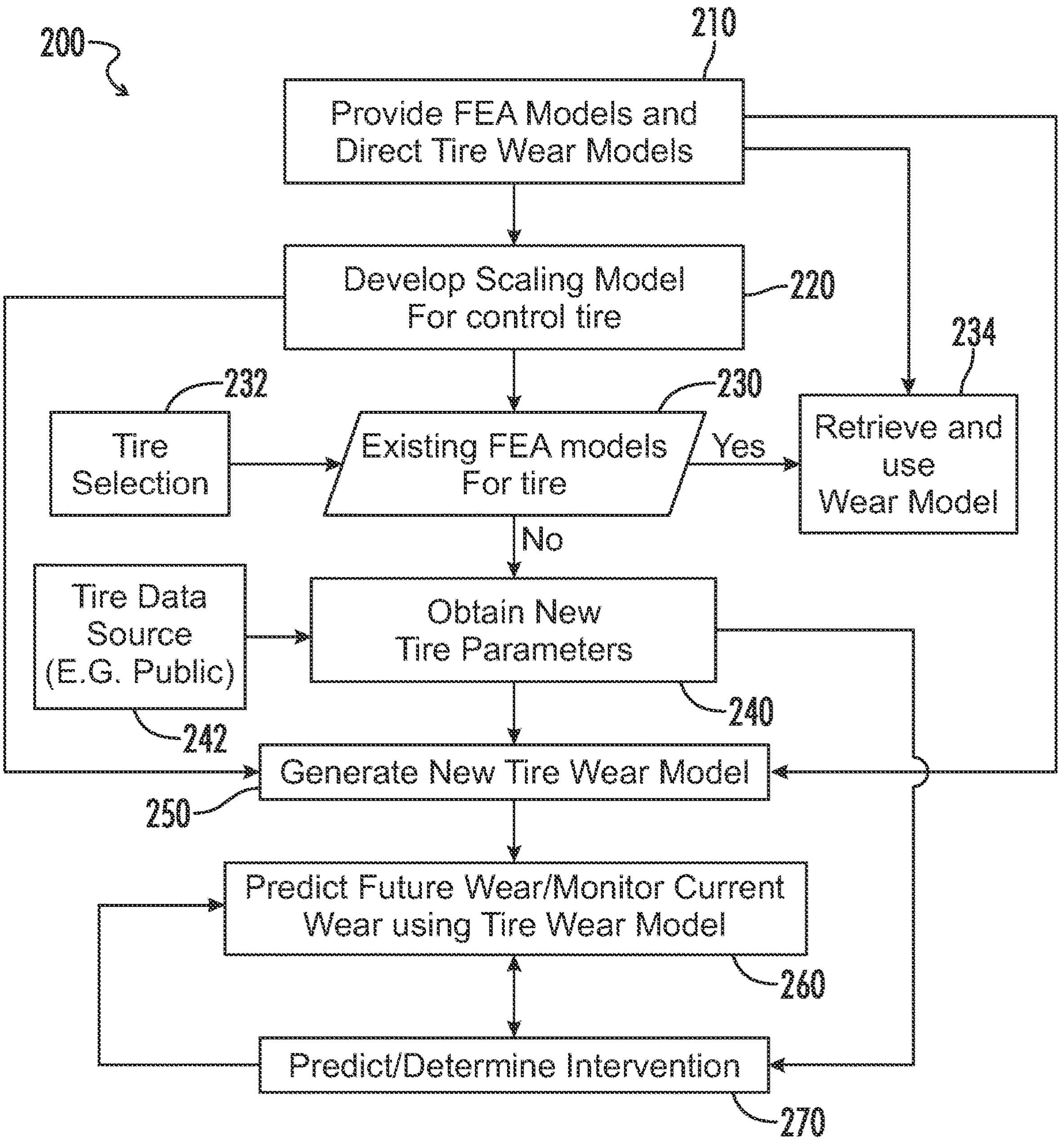
FIG. 2 is a flowchart representing an exemplary embodiment of a method as disclosed herein.

Referring next to FIG. 2, an exemplary embodiment of a method 200 for developing and implementing indirect tire wear models for new tires may be described as follows.

Initially, the method 200 may include providing or otherwise defining access to a plurality of existing FEA models for respective types of tires, and optionally to corresponding direct tire wear models. A "direct" tire wear model in this context may generally refer to a tire wear model for a particular tire that is developed based on an FEA model for the corresponding type of tire, and which may accordingly be regarded as quite accurate but costly and time-consuming to develop, as previously discussed. If a tire wear model is subsequently requested of the system 100 for an existing type of tire, via for example a tire selection or input 232, wherein an "existing" type of tire in this context connotes a type of tire for which an existing or otherwise accessible FEA model is available (i.e., "yes" in response to the query in step 230), the system 100 may accordingly retrieve or otherwise develop a tire wear model for the tire based on the corresponding FEA model, using conventional techniques.

If a tire wear model is requested of the system 100 for a new type of tire, or otherwise stated if a new type of tire is selected or otherwise input/presented to the system in step 232, wherein a "new" type of tire in this context connotes a type of tire for which an existing or otherwise accessible FEA model is unavailable (i.e., "no" in response to the query in step 230), the method 200 of the present disclosure further involves obtaining various tire parameters for the tire (step 240), based at least in part on publicly available specifications 242 for the tire such as from an online data source, and generating a new and "indirect" tire wear model (step 250) further in view of determined relationships, examples of which may be as follows.

Considering for example that the wear energy of a tire is related to the forces and slip seen at a tire/road contact interface, the average frictional energy seen by the tire can be calculated separately for fore/aft and lateral forces/slips as:

$$E_{fx} = F_x s_x = F_x K \quad \text{(Eq. 1)}$$

$$E_{fy} = F_y s_y = F_y \alpha \quad \text{(Eq. 2)}$$

where K is the slip ratio, and $\alpha$ is the slip angle seen by the tire.

This can be further simplified by assuming small amounts of slip (i.e., linear force-slip relationship) by including the slip/cornering stiffness of the tire. Offsets due to ply steer in the lateral case and rolling resistance in the fore/aft case may further considered, wherein the equations for the frictional energy then become:

$$E_{fx} \approx \frac{F_x^2}{k_\kappa} + \frac{F_x c_{RR} F_z}{k_\kappa} \quad E_{fy} \approx \frac{F_y^2}{k_\alpha} + F_y \alpha_0 \quad \text{(Eq. 3)}$$

where $k_k$ is the slip stiffness, $k_\alpha$ is the cornering stiffness, $C_{RR}$ is the rolling resistance coefficient, and $\alpha_0$ is the slip angle due to ply steer.

Additional frictional energy may also be caused due to inclination angle which is accounted for by $$E_{f\gamma} \approx \frac{(k_\gamma \gamma)^2}{k_\alpha} \quad \text{(Eq. 4)}$$

where $\gamma$ is the inclination angle, and $k_\gamma$ is the camber thrust stiffness of the tire. The wear energy may then be related to the frictional energy by multiplying by the resilience of the tread compound, which is a function of the tangent delta of the compound.

Figure 3:
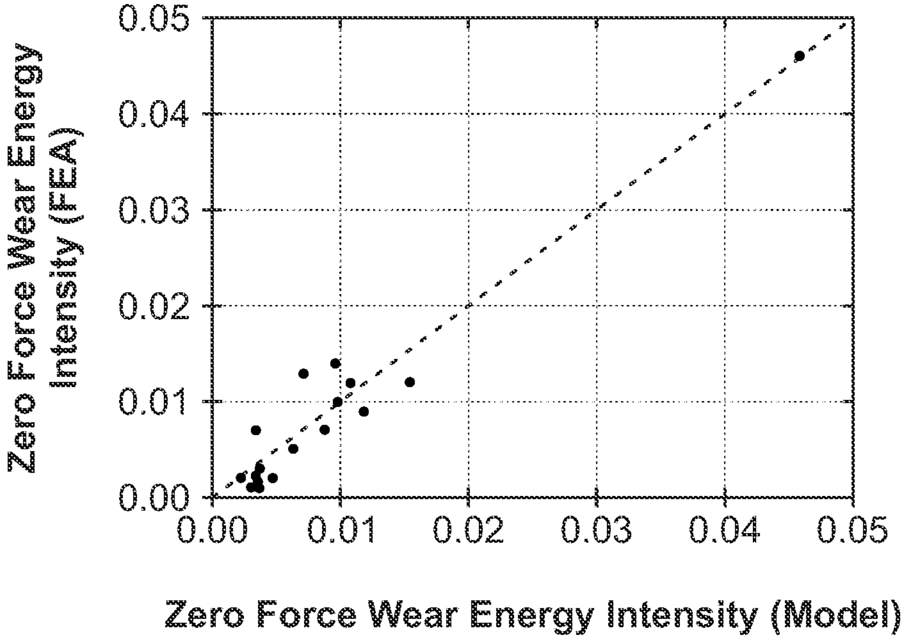
FIG. 3 is a graphical diagram representing a relationship between a determined zero force wear intensity for a given tire based on a direct (e.g., FEA) model and a determined zero force wear intensity for a given tire based on an indirect model as disclosed herein.

The above-referenced equations suggest that when zero lateral/fore/aft force is applied to the tire, the wear energy will also be zero. One of skill in the art may appreciate that this is not the case due to certain areas of the tire footprint (contact patch) being in a 'push' or a 'pull' condition where the net result is zero force. To account for this, an empirical relationship may be determined or otherwise accounted for between the wear energy at zero force and some of the tire parameters previously mentioned, which is given by:

$$E_{w0} = c_1 \left\{ \left[ \frac{(c_{RR} F_z)^2}{k_x} - c_2 k_x \frac{(R_{90} - 1)}{R_e} \right] \frac{\rho}{2b} \right\}^{c2} \quad \text{(Eq. 5)}$$

where the represented coefficients c1, c2 and c3 were all found in the present illustrative case by fitting to several FEA models of tires of different sizes and types, exemplary results of which are represented in FIG. 3.

Using simple models relating various tire dimensional and stiffness parameters to the parameters in the above equations, one or more control (i.e., scaling) models may be developed (step 220) including scale factors for respective selected control tires which have been modeled previously with the more accurate FEA method, and which for example may have been defined using the following relationships:

$$R_t = \frac{k_{t1}}{k_{t0}} = \frac{E_1}{E_0} \frac{h_0}{h_1} \frac{R_1}{R_0} \frac{k_{r0}}{k_{r1}} \frac{F_{z1}}{F_{z0}} \quad \text{(Eq. 6)}$$

$$R_c = \frac{k_{c1}}{k_{c0}} = \frac{R_1^3}{R_0^3} \frac{k_{s1}}{k_{s0}} \sqrt{\frac{F_{z0}}{F_{z1}} \frac{R_0}{R_1} \frac{b_1}{b_0} \frac{k_{r1}}{k_{r0}}} \quad \text{(Eq. 7)}$$

where R is the outer radius, h is the tread height, E is the tread compound modulus, kr is the radial stiffness, ks is the lateral stiffness, and b is the tire width, and the subscript 0 refers to the respective control tire, whereas 1 refers to the tire of interest in a given application of the respective control model. Rt is the scale factors applied to the tread stiffness of the control tire, and Rc is the scale factor applied to the carcass stiffness of the respective control tire.

The slip stiffness of the tire may be assumed to be equal to the tread stiffness, whereas the cornering stiffness is related to the carcass and tread by assuming two springs in series so that:

$$k_\alpha = \frac{1}{1/k_t + 1/k_c} \quad \text{(Eq. 8)}$$

Figure 4:
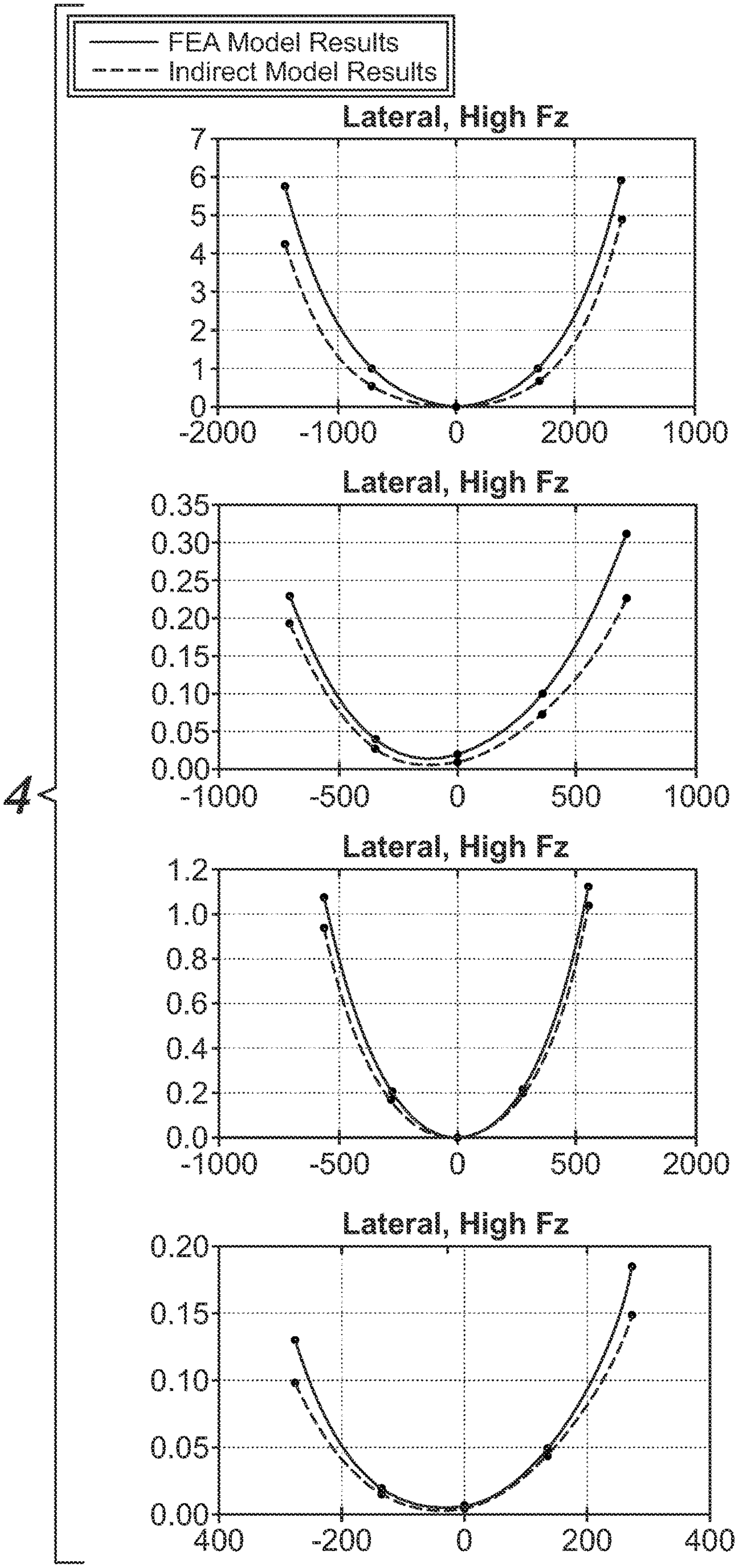
FIG. 4 includes four graphical diagrams representing relationships between lateral force results using a direct (e.g., FEA) model and using an indirect model as disclosed herein.

With further illustrative reference to FIG. 4, several tire models created using an FEA method were compared to analogous tire models developed in accordance with an embodiment of the method 200 as disclosed herein, wherein the relevant tire parameters were obtained using an online and publicly available resource, for example www.tirerack-.com, for the specific tire of interest.

Exemplary tire parameters as inputs to the developed model include an original tread depth, a tread width, a section width, an outer diameter, and a rim diameter, each of which can be obtained directly from the publicly available specifications for the tire of interest.

Additional exemplary tire parameters as inputs to the developed model may include predicted operating load and inflation pressure, which may for example be indirectly determined or otherwise predicted based on a vehicle type and/or application type (e.g., mid-size SUV, pickup and delivery, etc.).

Further exemplary tire parameters as inputs to the developed model may include tread compound parameters such as resilience, which as noted above is a function of the tangent delta of the compound, and may for example be determined or otherwise predicted based on a tire type and/or ratings (e.g., standard touring all-season, high-performance summer, etc., and/or uniform tire quality grading (UTQG), tread wear warranty, etc.).

In some embodiments, the method 200 and more particularly step 250 may include a tire wear model selection step, which for example may be dependent on application-related factors such as a wheel mounting position of the tire at issue, in view of any known or predicted relevant dependencies of the applied load based on such wheel mount distinctions.

As illustrated in FIG. 4, the relative accuracy of the indirectly developed tire models, further in combination with the relative ease of model development, demonstrates the potential utility of the method 200 as disclosed herein.

With the new tire wear model generated according to step 250, which may in some embodiments be a generic tire wear model for a particular type of tire or a tire wear model for a particular tire as developed from a generic model for the type of tire at issue, the method 200 may continue by predicting tire wear states at one or more times in the future for that particular tire and/or a determined tire-vehicle combination and/or a tire application (step 260).

The system 100 may collect inputs over time associated with tire use and further process the inputs for further development of the tire wear model for the particular tire, or in some embodiments for further development of the indirect tire model for the type of tire itself, based at least in part on a comparison of actual tire wear states at specified points in time with respect to the previously predicted tire wear states at the same points in time. For example, models relating to tire wear predictions can be updated over time using actual measurements, wherein the system can selectively "correct" model prediction with every measurement that is taken of a particular tire element and/or vehicle-tire system. To the extent that a tire wear model may be at least partially probabilistic in nature, allowing for potential time-series or similar progression curves over time and trying to blend or otherwise account for all such possibilities and related uncertainties in predicting future tire wear and associated events, feedback loops including actual tire wear values or corresponding inputs may accordingly allow the system 100 to effectively rule out or minimize in relevance certain such model components with respect to the given tire, or even with respect to the type of tire based on an aggregation of such inputs.

In an embodiment, the comparison may further consider one or more factors contributing to wear that are specific to the tire at issue and that were not considered (or at least not fully considered) at the predictive outset. Such factors may for example include driving style, vehicle alignment settings, routes driven, road surfaces, environmental conditions, tire manufacturing variability, etc., to represent known causes for variation in tire wear life span among otherwise equivalent tires.

During operation of a vehicle having the tire at issue installed thereon, the method 200 may further include a step 270 of determining or otherwise predicting and recommending tire interventions to relevant users of the system 100. For example, a feedback signal corresponding to the predicted tire wear state may be provided via an interface to an onboard device 150 associated with the vehicle itself, or to a mobile device associated with a user 160, such as for example integrating with a user interface configured to provide alerts or notice/recommendations of an intervention event, such as for example that one or more tires should or soon will need to be replaced, rotated, aligned, inflated, and the like.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

The invention claimed is:

1. A method of indirect tire wear modeling and implementation, the method comprising:

providing accessible finite element models and corresponding direct tire wear models for each of a plurality of types of tires;

iteratively developing a control model scaling values for a plurality of tire parameters for a selected control tire from the plurality of types of tires having a corresponding accessible finite element model to respective values for the plurality of tire parameters for an arbitrary type of tire lacking a corresponding accessible finite element model;

for a provided first type of tire lacking a corresponding accessible finite element model, obtaining corresponding values for the plurality of tire parameters;

generating an indirect tire wear model for the first type of tire based on the first control model, the corresponding direct tire wear model, and the obtained values for the first type of tire regarding the plurality of tire parameters; and predicting a tire wear state at one or more future distances and/or times for a first tire of the first type installed on a vehicle, based at least in part on the indirect tire wear model for the first type of tire.

2. The method according to claim 1, wherein a type of the vehicle and/or an application of the tire are provided as inputs to the indirect tire wear model for predicting the tire wear state at the one or more future distances and/or times.

3. The method according to claim 1, further comprising monitoring actual tire performance values of the first tire over time, and applying the monitored actual tire performance values to determine a current wear state of the first tire based on the indirect tire wear model for the first type of tire.

4. The method according to claim 3, comprising providing the determined current wear state of the first tire as feedback for iteratively developing a further tire wear model for the first type of tire.

5. The method according to claim 3, further comprising predicting a replacement time for the first tire, based on the current wear state or the predicted tire wear state as compared with tire wear thresholds associated with the first type of tire.

6. The method according to claim 1, wherein the step of generating an indirect tire wear model comprises determining a frictional energy associated with the first type of tire based at least in part on the first control model and the obtained values for the first type of tire regarding the plurality of tire parameters.

7. The method according to claim 6, wherein the frictional energy associated with the first type of tire is related to wear energy according to a determined resilience of a corresponding tread compound.

8. The method according to claim 6, wherein:

the step of developing the control model further comprises determining an empirical relationship between wear energy at zero force and values for the plurality of tire parameters, using one or more coefficients extrapolated from one or more of the plurality of accessible finite element models; and the step of generating an indirect tire wear model further comprises correlating the frictional energy associated with the first type of tire to wear energy based at least in part on the determined empirical relationship.

9. The method according to claim 1, wherein the control model comprises one or more scale factors for application to associated tire parameters relating to tread stiffness and/or carcass stiffness of the selected control tire.

10. A system for indirect tire wear modeling and implementation, the system comprising:

a data storage network having stored thereon accessible finite element models and corresponding direct tire wear models for each of a plurality of types of tires; and a computing network functionally linked to the data storage network and configured to direct the performance of operations comprising:

iteratively developing a control model scaling values for a plurality of tire parameters for a selected control tire from the plurality of types of tires having a corresponding accessible finite element model to respective values for the plurality of tire parameters for an arbitrary type of tire lacking a corresponding accessible finite element model;

for a provided first type of tire lacking a corresponding accessible finite element model, obtaining corresponding values for the plurality of tire parameters;

generating an indirect tire wear model for the first type of tire based on the first control model, the corresponding direct tire wear model, and the obtained values for the first type of tire regarding the plurality of tire parameters; and predicting a tire wear state at one or more future distances and/or times for a first tire of the first type installed on a vehicle, based at least in part on the indirect tire wear model for the first type of tire.

11. The system of claim 10, wherein a type of the vehicle and/or an application of the tire are provided as inputs to the indirect tire wear model for predicting the tire wear state at the one or more future distances and/or times.

12. The system of claim 10, wherein the computing network is further configured to monitor actual tire performance values of the first tire over time, and apply the monitored actual tire performance values to determine a current wear state of the first tire based on the indirect tire wear model for the first type of tire.

13. The system of claim 12, wherein the computing network is further configured to provide the determined current wear state of the first tire as feedback for iteratively developing a further tire wear model for the first type of tire.

14. The system of claim 12, wherein the computing network is further configured to predict a replacement time for the first tire, based on the current wear state or the predicted tire wear state as compared with tire wear thresholds associated with the first type of tire.

15. The system of claim 10, wherein the step of generating an indirect tire wear model comprises determining a frictional energy associated with the first type of tire based at least in part on the first control model and the obtained values for the first type of tire regarding the plurality of tire parameters.

16. The system of claim 15, wherein the frictional energy associated with the first type of tire is related to wear energy according to a determined resilience of a corresponding tread compound.

17. The system of claim 15, wherein:

the step of developing the control model further comprises determining an empirical relationship between wear energy at zero force and values for the plurality of tire parameters, using one or more coefficients extrapolated from one or more of the plurality of accessible finite element models; and the step of generating an indirect tire wear model further comprises correlating the frictional energy associated with the first type of tire to wear energy based at least in part on the determined empirical relationship.

18. The system of claim 10, wherein the control model comprises one or more scale factors for application to associated tire parameters relating to tread stiffness and/or carcass stiffness of the selected control tire.

* * * * *